(12) United States Patent
Ackerman et al.

(10) Patent No.: US 8,170,926 B1
(45) Date of Patent: May 1, 2012

(54) METHOD AND SYSTEM FOR INSTANT REDIRECTION OF AN ONLINE CONSUMER FROM A REFERRING WEBSITE TO A VENDOR WEBSITE

(76) Inventors: Jake Ackerman, South Jordan, UT (US); Steven Lloyd, Pleasant Grove, UT (US)

( * ) Notice: Subject to any disclaimer, the term of this patent is extended or adjusted under 35 U.S.C. 154(b) by 0 days.

(21) Appl. No.: 13/018,556

(22) Filed: Feb. 1, 2011

(51) Int. Cl.
*G06Q 30/00* (2006.01)
(52) U.S. Cl. .................................................. 705/26.8
(58) Field of Classification Search .............. 705/26.1, 705/26.7, 26.8, 27.1
See application file for complete search history.

(56) References Cited

U.S. PATENT DOCUMENTS

| | | | |
|---|---|---|---|
| 5,812,776 A | 9/1998 | Gifford | |
| 2001/0037192 A1 | 11/2001 | Shimamoto et al. | |
| 2002/0087332 A1 | 7/2002 | Como | |
| 2002/0112003 A1 | 8/2002 | Glorikian | |
| 2002/0138288 A1 | 9/2002 | Kurpis | |
| 2002/0147790 A1 | 10/2002 | Snow | |
| 2002/0169626 A1 | 11/2002 | Walker et al. | |
| 2003/0065789 A1 | 4/2003 | Meghashyam et al. | |
| 2003/0093287 A1 | 5/2003 | Lowen | |
| 2004/0133799 A1 | 7/2004 | Campbell | |
| 2004/0153352 A1 | 8/2004 | Berns | |
| 2004/0220848 A1 | 11/2004 | Leventhal | |
| 2005/0120006 A1 | 6/2005 | Nye | |
| 2005/0278421 A1 | 12/2005 | Simpson | |
| 2006/0074843 A1 | 4/2006 | Pereira | |
| 2007/0022006 A1 | 1/2007 | Lynn | |
| 2008/0140542 A1 | 6/2008 | Perron | |
| 2008/0288325 A1 | 11/2008 | Pavlov | |
| 2009/0228366 A1 | 9/2009 | Biris et al. | |
| 2010/0082590 A1 | 4/2010 | Nye | |

OTHER PUBLICATIONS

Author unknown, "Internet Company FreeWebStuff.com Is Auctioned on eBay," PR Newswire, Jul. 28, 2000, p. 1.*

* cited by examiner

*Primary Examiner* — Will Allen
*Assistant Examiner* — Brandy A Zukanovich
(74) *Attorney, Agent, or Firm* — Lyman Moulton, Esq.

(57) ABSTRACT

A system, method and computer program product for instant redirection of an online consumer from a referring website to a vendor website is disclosed. The method includes administering, via a single administrator, a plurality of referring websites in a plurality of goods and service provider categories and associating a single URL (uniform resource locator) for a client's website with at least one zip code as predetermined by the client. The method also includes automatically determining a zip code for the consumer visiting one of referring websites and comparing the zip code predetermined by the client with the consumer's zip code for a match. The method further includes instantly redirecting the consumer's browser to the client's website via the single URL when there is a match and otherwise directing the consumer's browser to a self-maintaining goods and service provider directory for a specific zip code.

15 Claims, 7 Drawing Sheets

METHOD AND SYSTEM FOR INSTANT REDIRECTION OF AN ONLINE CONSUMER FROM A REFERRING WEBSITE TO A VENDOR WEBSITE

BACKGROUND

Online consumers may use a search engine to give them a myriad of choices in a desired service or a product. However, there are times a consumer may need services or goods in an emergency such as when a child has a front tooth knocked out or a furnace needs repairing on a cold winter's night. In these instances and more, consumers want to quickly connect with a trusted and proven provider in their city or immediate area and don't have the time or the desire to sift through a long list of search engine hits to find what they need.

Furthermore, when a consumer is in urgent need of a dentist's services and enters 'dentist' in a search engine prompt, generic and long reserved domain names such as 'dentists.com' or the like may be returned at the top of the search according to search engine metrics and advertising agreements. However, more often than not, such sites offer services in a different geographical location than the consumer's city, county, or even state. Even though some referring websites offer vendors in geographic areas, lists of service providers still require time and effort from the consumer to narrow down available services to a single desired provider.

One type of consumer information source that is increasingly popular is the referring service based on a general geographic location entered by the user at a referring website. This may provide an internet consumer with an online directory of service providers in the consumer's general geographic location and may even include a service provider's name, phone number and address. However, the consumer still has to sift through a directory list of providers and place phone calls to several providers on the list to find the 'right one.'

Referring websites with online directories of service providers are not always reliable since a webmaster is required to keep the directories up to date. Still other referring websites may even allow the consumer to fill out forms online for an appointment to be scheduled with a service provider of choice. However, none of these online referrals provide the online consumer with a quick, convenient and reliable means of finding a proven service provider in a specific geographical location at any time of the day from any location with access to the internet.

SUMMARY OF THE INVENTION

A method and system for instant redirection an online consumer from a referring website to a vendor website is disclosed. The method includes administering, via a single administrator, a plurality of referring websites in a plurality of goods and service provider categories and associating a single URL (uniform resource locator) for a client's website with at least one zip code as predetermined by the client. The method also includes automatically determining a zip code for the consumer visiting one of the plurality of referring websites and comparing the zip code predetermined by the client with the consumer's zip code for a match. The method further includes instantly redirecting the consumer's browser to the client's website via the single URL when there is a match and otherwise directing the consumer's browser to a self-maintaining goods and services provider directory for a specific zip code.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

With the number of websites online numbering in the hundreds of millions and burgeoning every year, referring websites can be critical to generating business online. A consumer's online search may return a myriad of direct links to vendor's websites but often may also include some referring website links. Referring websites may help a consumer narrow down a myriad of search results by categorizing a vendor's products or services to specific industries and specific geographical areas. A referring website is a website that may not offer goods or services itself but may offer a link to goods or services indicative of the website name or tags or keywords associated with the referring website. The term 'referring website' used herein may also comprise the term 'referring webpages.' The term 'client' used herein may comprise a vendor and the term 'client website' may therefore refer to a vendor website comprising multiple webpages linked to a domain address representing an online business.

Therefore, a referring website service as disclosed and detailed herein may administer and offer a multitude of referring websites to clients. A client wishing to purchase referring services from the administrator may therefore bargain to have multiple referring websites refer consumers to his one business website. On the other hand, clients doing business in multiple service industries are able to bargain with the single administrator to have at least one referring website for each of their disparate business websites. An administrator may therefore be a single business entity and/or a single administrative website bargaining with clients wishing to purchase online referring services. A service provider may also be a client of the administrator but not in all cases. Where a business relationship has been broken or expired, a former client of the administrator may remain a service provider on a referring website.

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Figure 1:
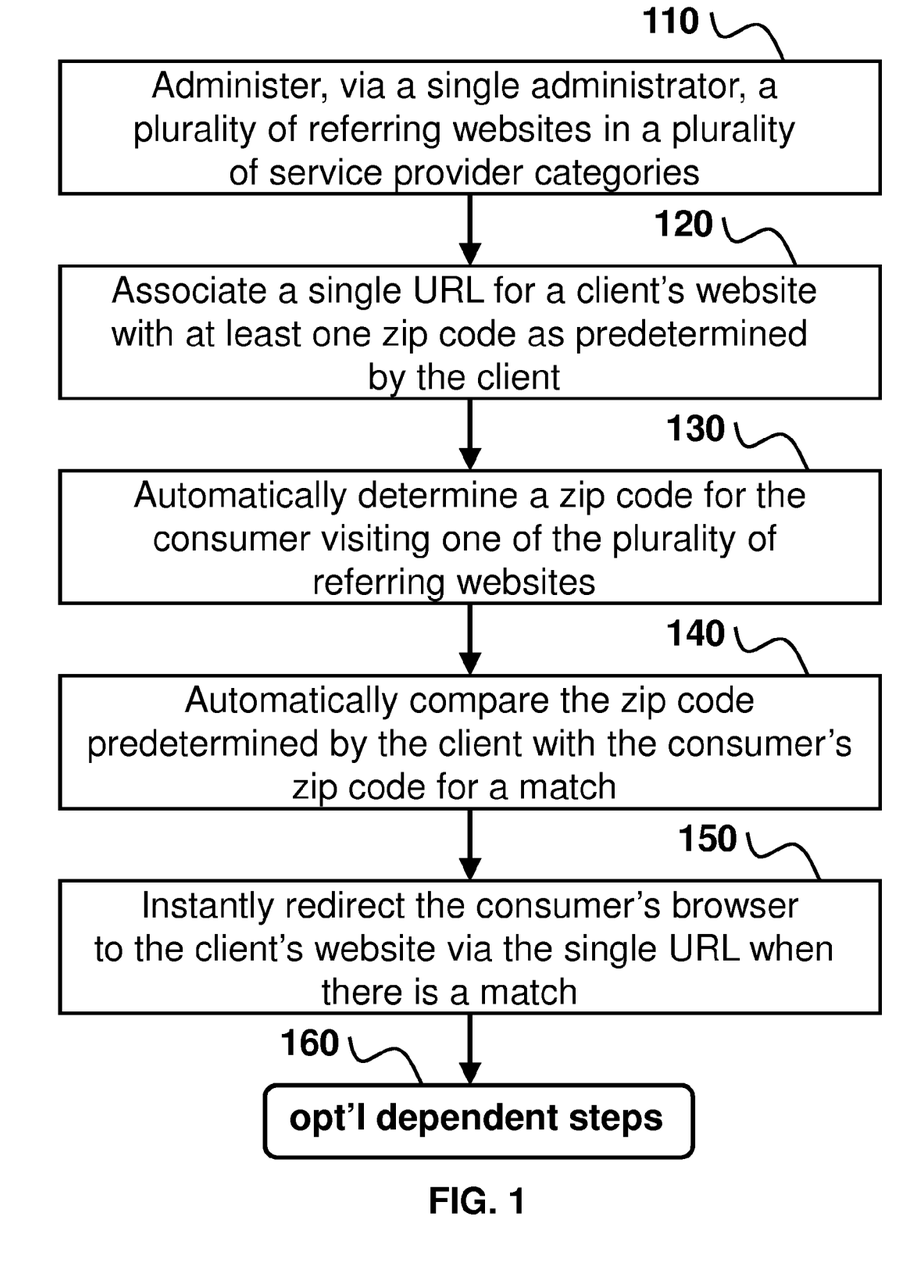
FIG. 1 depicts a flow chart of a method for instant redirection of an online consumer from a referring website to a vendor website in accordance with an embodiment of the present disclosure.

FIG. 1 depicts a flow chart of a method for instant redirection of an online consumer from a referring website to a vendor website in accordance with an embodiment of the present disclosure. The method includes administering 110, via a single administrator, a plurality of referring websites in a plurality of service provider categories. The method also includes associating 120 a single URL for a client's website with at least one zip code as predetermined by the client. The method additionally includes automatically determining 130 a zip code for the consumer visiting one of the plurality of referring websites. The method further includes automatically comparing 140 the zip code predetermined by the client with the consumer's zip code for a match. The method yet includes instantly and automatically redirecting 150 the consumer's browser to the client's website via the single URL when there is a match. The method still yet includes 'optional dependent steps' 160 for claims depending from the independent claim.

An embodiment of the disclosed method may include informing the consumer of the redirection of their browser via an unsolicited and temporary popup window displayed on the consumer's browser prior to redirection, the redirection based on a determined zip code for the consumer. Embodiments may also include redirecting the consumer's browser via a single cursor click from the consumer at the referring website, the single cursor click resulting from the consumer selecting zip code data displayed on the referring website.

Another embodiment of the disclosed method may include triangulating a wireless consumer's location from a plurality of cell phone towers and/or a plurality of global positioning satellites and equating the consumer's location with a zip code. An online consumer's zip code may be automatically determined from decoding a zip code from an internet protocol (IP) address for the consumer in other embodiments of the disclosure. The decoded zip code may then be used to prompt the consumer for input related to near and adjacent zip codes using a map display on the referring website and other input from the consumer. The disclosed embodiment may also include displaying a plurality of hyperlink markers on the map display, each of the markers bearing a label to indicate a distinct zip code associated with an area of the map display. The disclosed embodiment may further include redirecting the consumer to the client's website via the consumer's click on a marker and a match of a zip code associated with the marker and the client's predetermined zip code.

An additional embodiment of the disclosed method may include receiving a zip code entered by the consumer into a data field on the referring website. Alternatively, a consumer may enter a city into a browser data field or select one of the cities presented on the referral website. The city may be decoded into at least one zip code for the consumer based on a table of zip codes for possible cities in any given state. The consumer may also be directed to the client's business website when the URL associated with the predetermined zip code matches at least one decoded zip code.

The disclosed method comprises categories of service providers including doctors, dentists, lawyers, plumbers, florists, insurance agents, landscapers, veterinarians, mechanics, realtors, movers, chiropractors, roofers, building contractors, electricians, heating ventilation and air conditioning (HVAC) technicians, pest control agents, restaurateurs, entertainers and the like. The service categories narrow down service providers available to the online consumer according to a taxonomy of services in different industries. Also, administering multiple referring websites across many different service provider categories allows a client to contract with the administrator to refer consumers to his business website from multiple referring websites at the same time. For instance, a client having a used furniture business is able to contract for referrals from a furniture sales referral website and a moving services referring website at the same time.

Figure 2:
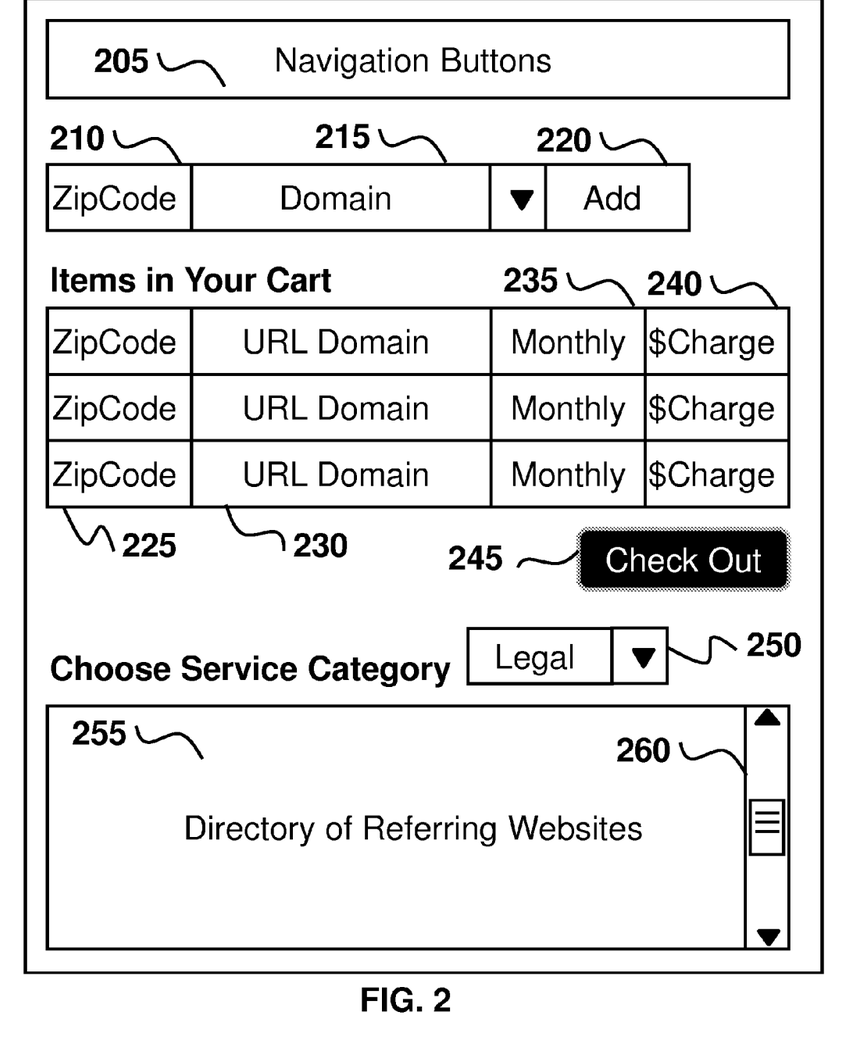
FIG. 2 depicts a client's dashboard computer screen when bargaining for the association of a zip code with a website domain URL for a period of time in accordance with an embodiment of the present disclosure.

FIG. 2 depicts a client's dashboard computer screen when bargaining for the association of a zip code with a website domain URL for a period of time in accordance with an embodiment of the present disclosure. The dashboard includes navigation buttons 205 comprising summary, company info, financial center, settings, and shopping navigation buttons. The dashboard also includes an add zip code field 210, an add domain field 215 and an add button 220. Additionally, the dashboard includes at least one shopping cart line item but up to multiple shopping cart line items comprising a zip code column 225, a URL domain column 230, a bargained-for time period column 235 and a dollar charge column 240. The dashboard further includes a check out button 245, a 'Choose Services Category' radial button 250 and a directory 255 of referring websites in the chosen service category, the referring websites administered by a single administrator to redirect a consumer to a client's website. The directory of referring websites comprises a scroll bar 260 to enable the client to scroll down the list of referring websites to choose among those offered by the administrator.

An embodiment of the method for instantly redirecting an online consumer from a referring website further comprises reserving for a period of time the association of at least one zip code with a single URL based on a bargained for exchange between the client and an administrator of the method. Also, the embodiment includes using the association in at least one of the referring websites in at least one of the service provider categories based on the bargained for exchange to redirect the consumer's browser to the client's website.

Another embodiment of the disclosure comprises offering to the client a plurality of zip codes with demographical information relating to each zip code enabling the client to make an informed purchase of an association of a zip code with a URL. The client may be billed at a predetermined rate on a periodic basis for the association of one zip code of the client's choosing with a URL of the client's choosing.

Figure 3:
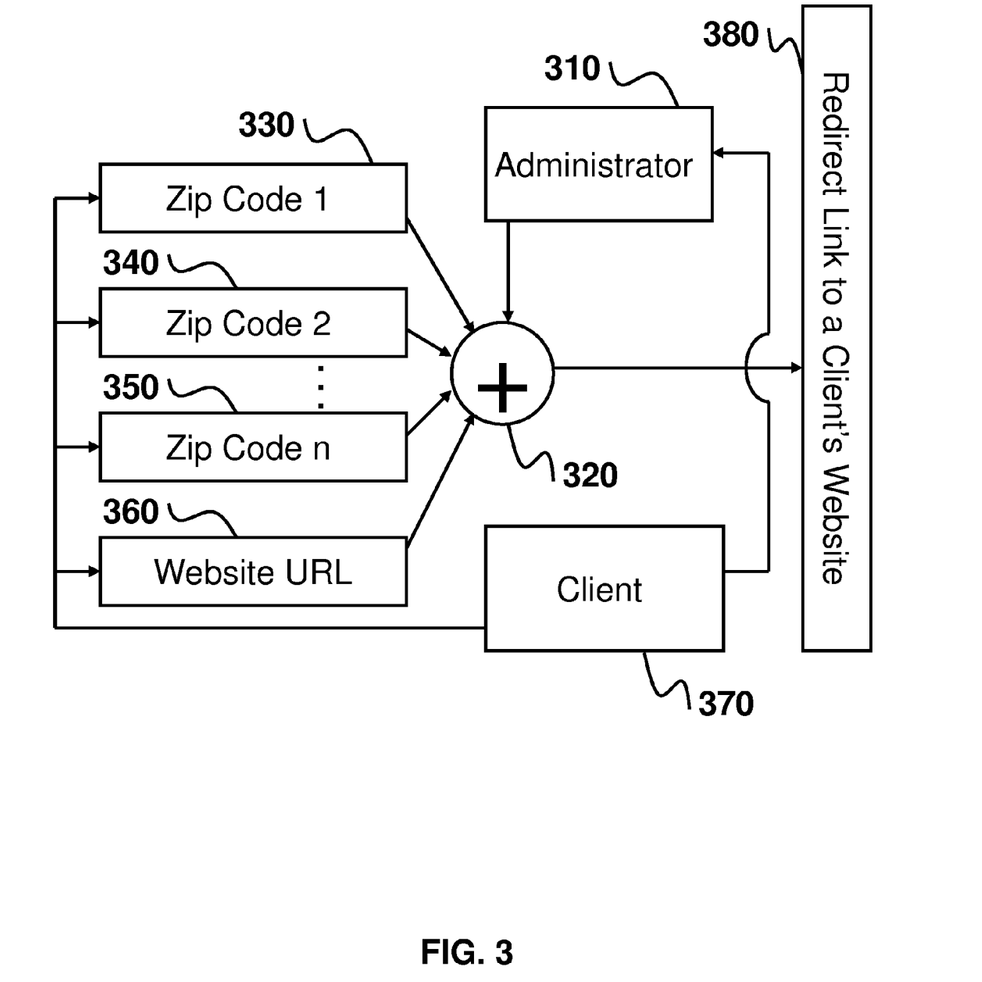
FIG. 3 graphically depicts the generation of a redirect link to a client's website with zip code and URL input from the client in accordance with an embodiment of the present disclosure.

FIG. 3 graphically depicts the generation of a redirect link to a client's website with zip code and URL input from the client in accordance with an embodiment of the present disclosure. The depiction includes input from the administrator 310, an association module 320, a first zip code 330, a second zip code 340 up to an nth zip code 350 input from the client and a website URL 360 input from the client 370. The redirect link 380 to a client's website is generated from the association module 320 incorporating the client's input and the administrator's input. As depicted, any number of zip codes may be associated with a single URL of the client's choosing in a predetermined industry. The depicted method may occur in a bargained for exchange between the client and an administrator of the method as shown in FIG. 2 above.

Figure 4:
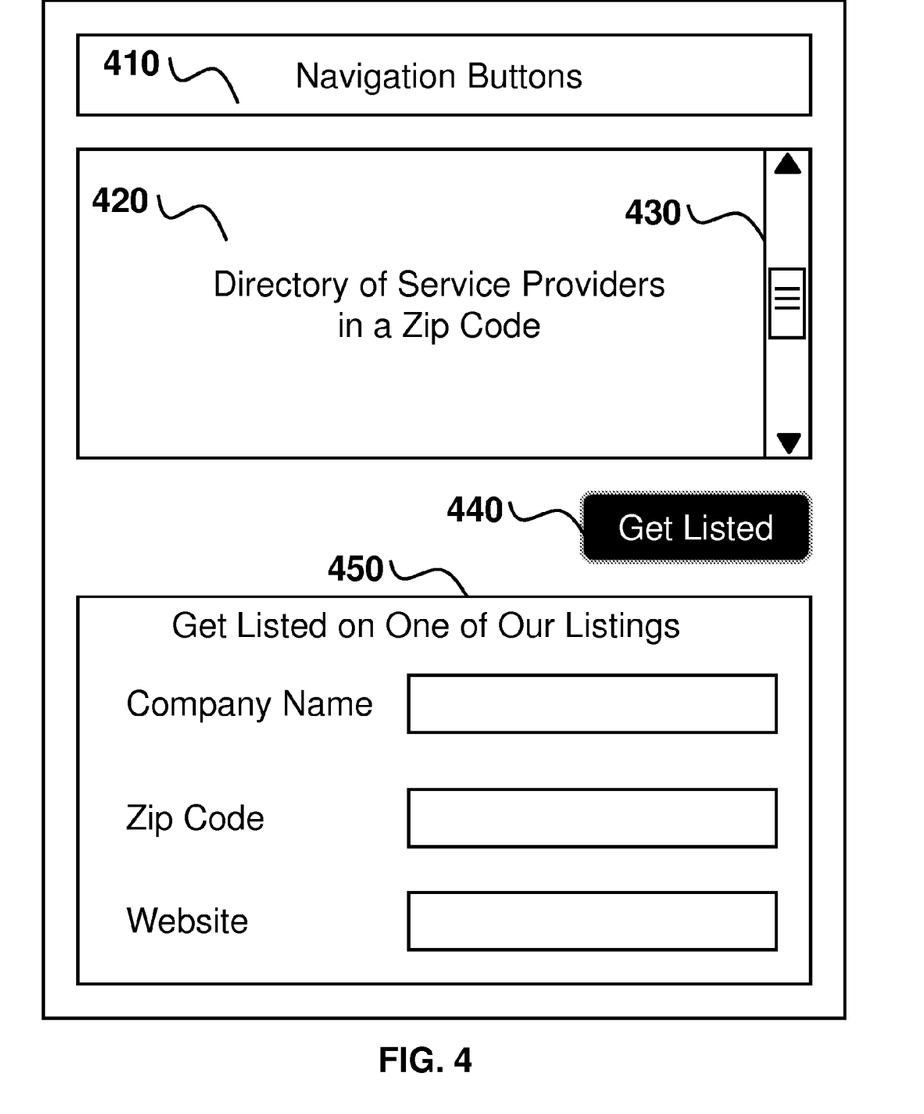
FIG. 4 depicts a directory computer screen at a referring website in a predetermined goods or services category including a zip code specific volunteer listing in accordance with an embodiment of the present disclosure.

FIG. 4 depicts a directory computer screen at a referring website in a predetermined goods or services category including a zip code specific volunteer listing in accordance with an embodiment of the present disclosure. The navigation buttons 410 may comprise summary, company info, financial center, settings and shopping navigation buttons. The directory of goods or service providers in a zip code 420 may comprise referring websites in the chosen goods or services category, the referring websites administered by the single administrator. The directory of referring websites 420 may also comprise a scroll bar 430 to enable the client to scroll down the length of a plurality of referring websites to choose among those offered by the administrator. The 'Get Listed' radial button 440 allows a client to enter information in the 'Get Listed on One of Our Listings' input field 450. The input field 450 may include a field for 'company name,' a field for zip code, and a 'website' field for the client to enter his or her website URL domain name.

In embodiments of the disclosure, an online consumer may be redirected to a directory webpage at the referring website based on the consumer's zip code. The directory webpage may comprise a plurality of vendors in a predetermined service category. The directory webpage may be compiled for each of the referring websites from a plurality of service providers who volunteer contact information to the administrator for a specific zip code in a predetermined service category.

Figure 5:
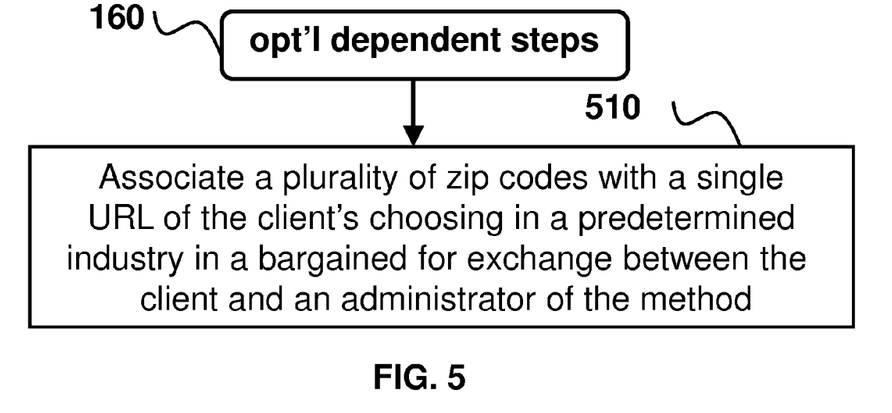
FIG. 5 depicts a flow chart of a method for associating a plurality of zip codes with a single URL of the client's choosing in a bargained for exchange in accordance with an embodiment of the present disclosure.

FIG. 5 depicts a flow chart of a method for associating a plurality of zip codes with a single URL of the client's choosing in a bargained for exchange in accordance with an embodiment of the present disclosure. The embodiment includes the steps of the flow chart of FIG. 1 as referenced by the step 160 'optional dependent steps.' The embodiment also includes associating 510 a plurality of zip codes with a single URL of the client's choosing in a predetermined industry in a bargained for exchange between the client and an administrator of the method.

Figure 6:
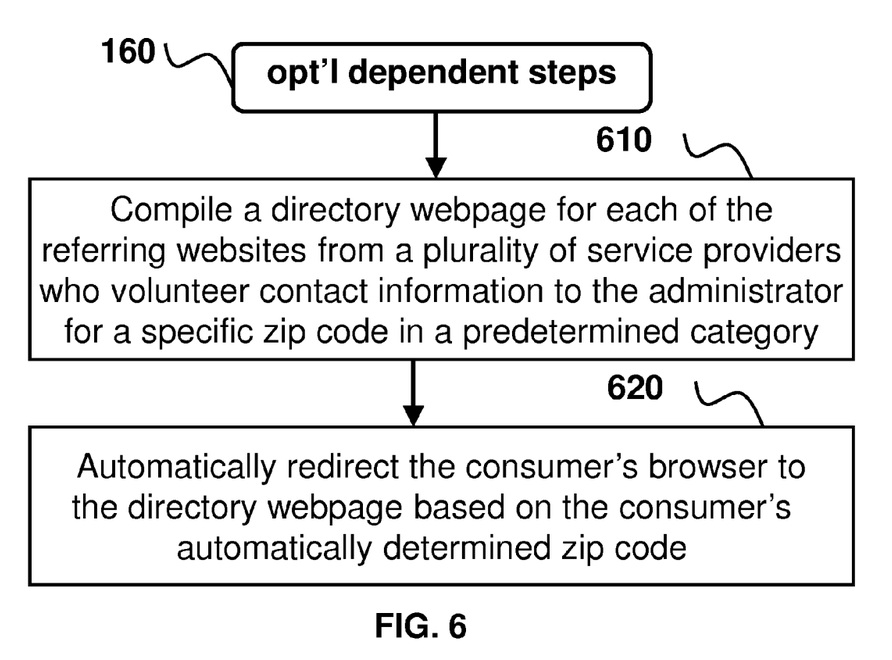
FIG. 6 depicts a flow chart of a method for compiling a self-maintaining directory webpage of goods and service providers for a specific zip code in a predetermined category at a referring website in accordance with an embodiment of the present disclosure.

FIG. 6 depicts a flow chart of a method for compiling a self-maintaining directory webpage of service providers for a specific zip code in a predetermined goods and services category at a referring website in accordance with an embodiment of the present disclosure. The embodiment includes the steps of the flow chart of FIG. 1 as referenced by the step 160 'optional dependent steps.' The embodiment also includes compiling 610 a self-maintaining directory webpage for each of the referring websites from a plurality of goods and service providers who volunteer contact information to the administrator for a specific zip code in a predetermined category. The embodiment further includes instantly and automatically redirecting 620 the consumer's browser to the directory webpage based on the consumer's automatically determined zip code. The directory webpage is self-maintaining in the sense that a goods and/or services provider volunteers changes to his business contact information to the administrator for posting on the referring website.

Figure 7:
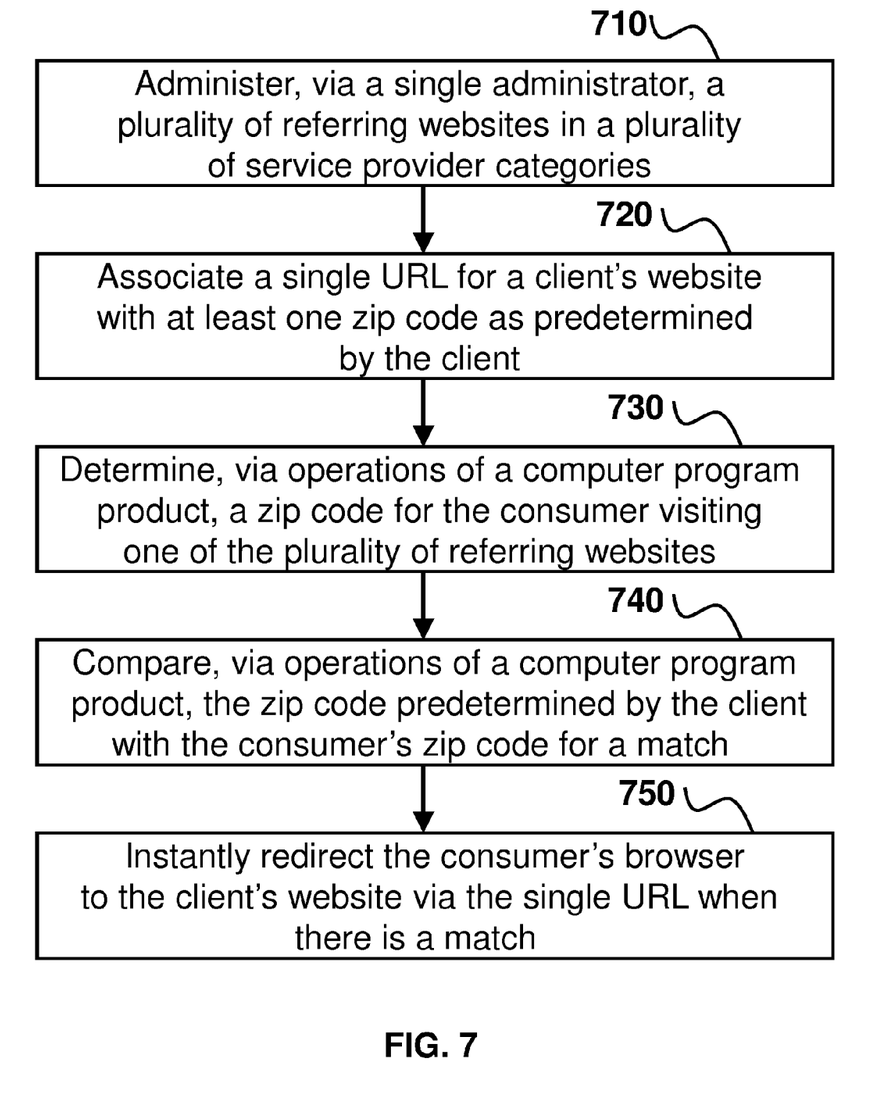
FIG. 7 depicts a flow chart of a method for instant redirection of an online consumer from a referring website to a vendor website via operations of a computer program product in accordance with an embodiment of the present disclosure.

FIG. 7 depicts a flow chart of a method for instant redirection of an online consumer from a referring website to a vendor website via operations of a computer program product in accordance with an embodiment of the present disclosure. The computer program product may comprise a computer readable medium having computer useable program code executable to perform operations for redirecting an online consumer from a referring website. The operations of the computer program product comprise administering 710, via a single administrator, a plurality of referring websites in a plurality of goods and service provider categories and associating 720 a single URL for a client's website with at least one zip code as predetermined by the client. The operations of the computer program product also comprise determining 730 a zip code for the consumer visiting one of the plurality of referring websites and comparing 740 the zip code predetermined by the client with the consumer's zip code for a match. The operations of the computer program product further comprise instantly redirecting 750 the consumer's browser to the client's website via the single URL on a match. The instant redirection is done automatically w/o further customer input needed.

Figure 8:
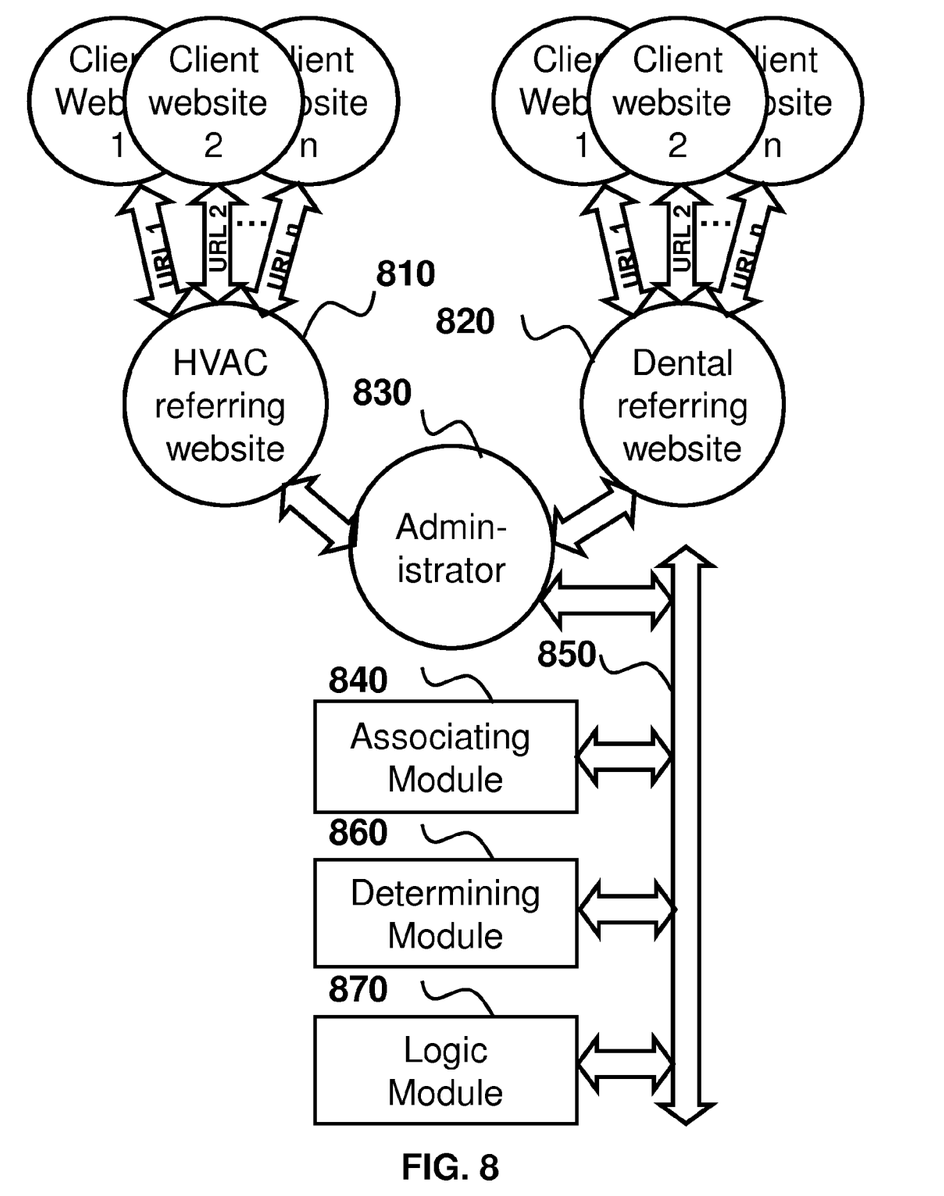
FIG. 8 depicts a system for instant redirection of an online consumer from a referring website to a vendor website in accordance with an embodiment of the present disclosure.

FIG. 8 depicts a system for instant redirection of an online consumer from a referring website to a vendor website in accordance with an embodiment of the present disclosure. A plurality of referring webpages are depicted sharing a common administration, where each referring webpage includes at least one provider category from a plurality of goods and services provider categories, i.e. a referring webpage for HVAC (heating ventilation and air conditioning) services 810 and a referring webpage for Dental services 820. As depicted, URL 1 redirects a consumer's browser to client website 1, URL 2 redirects a consumer's browser to client website 2 and URL n redirects a consumer's browser to client website n and likewise for URL links regarding the Dental referring website 820. Both the HVAC and the Dental referring websites are administered by the single Administrator 830. An associating module 840 is configured to associate a single URL for a client's website with at least one zip code as predetermined by the client. The associating module 840 communicates over a bus 850 with the administrator 830. A determining module 860 is configured to determine a zip code as a result of data relating to the consumer visiting one of the plurality of referring websites. The determining module 860 also communicates over the bus 850 with the Administrator 830 and with the associating module 840. A logic module 860, also in communication with the Administrator 830 and the other two modules over the bus 850, is configured to compare a zip code predetermined by the client with the consumer's zip code for a match and to redirect the consumer's browser via one of the URL links above to the client's website when there is a match and otherwise redirect the consumer's browser to a self-maintaining service provider directory for a specific zip code and service industry category.

A further embodiment of the method for instantly redirecting an online consumer from a referring website comprises compiling a self-maintaining directory webpage for each of the referring websites from a plurality of goods and services providers who volunteer contact information to the administrator for a specific zip code in a predetermined service category. The embodiment also comprises automatically redirecting the consumer's browser to the directory webpage based on the consumer's automatically determined zip code. A plurality of zip codes may be associated with a single URL of the client's choosing in a predetermined industry in a bargained for exchange between the client and an administrator of the method.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A method for redirecting an online consumer's browser from a referring website to a vendor's website, comprising:
   a) administering, via a single administrator website operating on a computer, a plurality of referring websites in a plurality of goods and service provider categories;
   b) associating a plurality of zip codes with a single URL (uniform resource locator) for a vendor's website as predetermined by the vendor;
   c) reserving for a period of time the association of the plurality of zip codes with the single URL based on a bargained for exchange between the vendor and the administrator website;
   d) automatically determining a zip code for a consumer visiting one of the plurality of referring websites;
   e) automatically comparing the plurality of zip codes associated with the single URL with the consumer's zip code for a match; and
   f) instantly redirecting a browser of the consumer to the vendor's website via the single URL based upon the match.

2. The method for redirecting an online consumer's browser from a referring website of claim 1, wherein f) instantly redirecting the consumer's browser further comprises informing the consumer of the redirection via an unsolicited and temporary popup window displayed on the consumer's browser, the redirection based on a determined zip code for the consumer.

3. The method for redirecting an online consumer's browser from a referring website of claim 1, wherein f) instantly redirecting the consumer's browser further comprises redirecting the browser via a single cursor click from the consumer at the referring website, the single cursor click resulting from the consumer selecting zip code data displayed on the referring website.

4. The method for redirecting an online consumer's browser from a referring website of claim 1, wherein d) automatically determining a zip code for the consumer further comprises decoding a zip code from an internet protocol (IP) address for the consumer.

5. The method for redirecting an online consumer's browser from a referring website of claim 4, wherein d) automatically determining a zip code for the consumer further comprises using the decoded zip code to prompt the consumer for input related to near and adjacent zip codes using a map display on the referring website and other input from the consumer.

6. The method for redirecting an online consumer's browser from a referring website of claim 5, further comprising:
   a) displaying a plurality of hyperlink markers on the map display, each of the markers bearing a label to indicate a distinct zip code associated with an area of the map display; and
   b) redirecting the consumer to the vendor's website via the consumer's click on a marker and a match of a zip code associated with the marker and the vendor's predetermined zip code.

7. The method for redirecting an online consumer's browser from a referring website of claim 1, wherein d) automatically determining a zip code for the consumer further comprises receiving a zip code entered by the consumer into a data field on the referring website.

8. The method for redirecting an online consumer's browser from a referring website of claim 1, further comprising:
   a) receiving a city entered by the consumer into a data field on the referring website;
   b) decoding the city into at least one zip code for the consumer based on a table of zip codes for possible cities in any given state; and
   c) directing the consumer to the client's website when the URL associated with the predetermined zip code matches at least one decoded zip code.

9. The method for redirecting an online consumer from a referring website of claim 1, wherein the plurality of referring websites are provided in a taxonomy of goods and service provider categories.

10. The method for redirecting an online consumer from a referring website of claim 1, wherein the plurality of goods and service provider categories comprise doctors, dentists, lawyers, plumbers, florists, insurance agents, landscapers, veterinarians, mechanics, realtors, movers, chiropractors, roofers, building contractors, electricians, heating ventilation and air conditioning (HVAC) technicians, pest control agents, restaurateurs, entertainers and the like.

11. The method for redirecting an online consumer from a referring website of claim 1, further comprising
   using the association in at least one of the referring websites in at least one of the service provider categories based on the bargained for exchange to redirect the consumer's browser to the vendor's website.

12. The method for redirecting an online consumer from a referring website of claim 1, further comprising associating a plurality of zip codes with a single URL of the vendor's choosing in a predetermined industry in a bargained for exchange between the vendor and the administrator website.

13. The method for redirecting an online consumer from a referring website of claim 1, further comprising:
   a) compiling a self-maintaining directory webpage for each of the referring websites from a plurality of service providers who volunteer contact information to the administrator website for a specific zip code in a predetermined service category;
   b) automatically redirecting the consumer's browser to the directory webpage based on the consumer's automatically determined zip code.

14. A non-transitory computer readable medium having computer useable program code executable to perform operations for redirecting an online consumer from a referring website, the operations of the computer program product, comprising:
   a) administering, via a single administrator website operating on a computer, a plurality of referring websites in a plurality of goods and service provider categories;
   b) associating a plurality of zip codes with a single URL (uniform resource locator) for a vendor's website as predetermined by the vendor;

c) reserving for a period of time the association of the plurality of zip codes with the single URL based on a bargained for exchange between the vendor and the administrator website
d) automatically determining a zip code for a consumer visiting one of the plurality of referring websites;
e) automatically comparing the plurality of zip codes associated with the single URL with the consumer's zip code for a match; and
f) instantly redirecting a browser of the consumer to the vendor's website via the single URL based upon the match.

15. A system for redirecting an online consumer from a referring website comprising:
   an administrator website system; and
   a computer configured to provide access through a network to an administrator website system;
   the administrator website system configured to:
      a) store a plurality of referring webpages sharing a common administration, each referring webpage including at least one category from a plurality of goods and service provider categories;
      b) associate a plurality of zip codes with a single URL (uniform resource locator) for a vendor's website as predetermined by the vendor;
      c) reserve for a period of time the association of the plurality of zip codes with the single URL based on a bargained for exchange between the vendor and the administrator website
      d) determine a zip code for a consumer visiting one of the plurality of referring websites;
      e) compare the plurality of zip codes associated with the single URL with the consumer's zip code for a match; and
      f) redirect a browser of the consumer to the vendor's website via the single URL based upon the match.

* * * * *